United States Patent
Yoon et al.

(10) Patent No.: US 11,197,184 B2
(45) Date of Patent: Dec. 7, 2021

(54) METHOD AND DEVICE FOR TRANSMITTING OR RECEIVING SIGNAL IN WIRELESS COMMUNICATION SYSTEM

(71) Applicant: LG ELECTRONICS INC., Seoul (KR)

(72) Inventors: Sukhyon Yoon, Seoul (KR); Hyunsoo Ko, Seoul (KR); Kijun Kim, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 16/635,976

(22) PCT Filed: Aug. 10, 2018

(86) PCT No.: PCT/KR2018/009182
§ 371 (c)(1),
(2) Date: Jan. 31, 2020

(87) PCT Pub. No.: WO2019/031919
PCT Pub. Date: Feb. 14, 2019

(65) Prior Publication Data
US 2021/0144573 A1    May 13, 2021

Related U.S. Application Data

(60) Provisional application No. 62/543,992, filed on Aug. 11, 2017.

(51) Int. Cl.
*H04W 24/10* (2009.01)
*H04B 17/318* (2015.01)
(Continued)

(52) U.S. Cl.
CPC .......... *H04W 24/10* (2013.01); *H04B 7/0617* (2013.01); *H04B 7/0632* (2013.01); *H04B 17/318* (2015.01); *H04W 16/28* (2013.01)

(58) Field of Classification Search
CPC ... H04W 24/00; H04W 24/10; H04W 72/046; H04W 76/27; H04W 88/02; H04W 88/06; H04B 17/318; H04B 17/309; H04L 1/0026
See application file for complete search history.

(56) References Cited

U.S. PATENT DOCUMENTS 8,385,833 B2    2/2013  Lindoff
8,843,123 B1 *  9/2014  Perets ............... H04W 36/0085
                                                            455/418
(Continued)

FOREIGN PATENT DOCUMENTS

| EP | 2574095 | 3/2013 |
| KR | 1020160094337 | 8/2016 |
| WO | 2011093681 | 8/2011 |

OTHER PUBLICATIONS

Machine Translation of KR20160094337 (Foreign Patent Document 1 in IDS of May 1, 2020), translation obtained from espacenet.com on Apr. 24, 2021 (Year: 2016).*

(Continued)

*Primary Examiner* — David S Huang
(74) *Attorney, Agent, or Firm* — Lee Hong Degerman Kang & Waimey

(57) ABSTRACT

A method by which a user device comprising a plurality of RF modules and a plurality of antenna modules transmits and receives a signal in a wireless communication system, according to the present invention, includes the steps of: during a measurement interval for the measurement of the quality of a neighbor cell, using the first antenna module, among a plurality of antenna modules, to communicate with a serving cell, and using the second antenna module, among the plurality of antenna modules, to measure the quality of (Continued)

one or more neighbor cells; and reporting the measurement result to the base station of the serving cell.

9 Claims, 8 Drawing Sheets

(51) Int. Cl.
*H04B 7/06* (2006.01)
*H04W 16/28* (2009.01)

(56) References Cited

U.S. PATENT DOCUMENTS

| | | |
|---|---|---|
| 9,237,459 B1 | 1/2016 | Erell et al. |
| 2015/0017923 A1 | 1/2015 | Mutya et al. |
| 2015/0327103 A1 | 11/2015 | Tang et al. |

OTHER PUBLICATIONS

PCT International Application No. PCT/KR2018/009182, Written Opinion of the International Searching Authority dated Dec. 27, 2018, 24 pages.
European Patent Office Application Serial No. 18843232.2, Search Report dated Apr. 6, 2021, 10 pages.

* cited by examiner (a)            (b)

METHOD AND DEVICE FOR TRANSMITTING OR RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2018/009182, filed on Aug. 10, 2018, which claims the benefit of U.S. Provisional Application No. 62/543,992, filed on Aug. 11, 2017, the contents of which are all hereby incorporated by reference herein in their entirety.

TECHNICAL FIELD

The present invention relates to a wireless communication system and, more particularly, to a method and apparatus for transmitting and receiving a radio signal

BACKGROUND ART

As many more communication devices have required higher communication capacity, the necessity of the enhanced mobile broadband (eMBB) communication much improved than the legacy radio access technology (RAT) has increased. In addition, massive machine type communication (mMTC) capable of providing various services at anytime and anywhere by connecting a number of devices or objects to each other has been considered in the next generation communication system.

Moreover, a communication system design capable of supporting services/UEs sensitive to reliability and latency has been discussed. The introduction of the next generation RAT considering the eMBB communication, mMTC, Ultra-reliable and low latency communication (URLLC), and the like has been discussed.

DETAILED DESCRIPTION OF THE DISCLOSURE

Technical Problems

A method of efficiently measuring the received quality of neighboring cells in a wireless communication system is needed.

A method of reducing overhead caused by the received quality of neighboring cells in a wireless communication system is needed.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of transmitting and receiving a signal by a user equipment (UE) including a plurality of radio frequency (RF) modules and a plurality of antenna modules in a wireless communication system, including performing communication with a serving cell using a first antenna module among the plural antenna modules and measuring quality of one or more neighboring cells using a second antenna module among the plural antenna modules, during a measurement interval for measuring the quality of the neighboring cells, and reporting a measurement result to a base station (BS) of the serving cell.

In each aspect of the present disclosure, the method may include receiving configuration information about measurement of the quality of the neighboring cells from the BS, and the configuration information may include at least one of a starting time of the measurement interval, length of the measurement interval, or resource allocation information of a reference signal for measuring the quality of the neighboring cells.

In each aspect of the present disclosure, the information about the measurement interval configuration may include at least one of information about types of antenna modules included in the second antenna module among the plural antenna modules or information about the number of antenna modules included in the second antenna module among the plural antenna modules.

In each aspect of the present disclosure, the measuring the quality of the one or more neighboring cells may include detecting the one or more neighboring cells and a reception beam corresponding to a transmission beam of each of the detected neighboring cells by performing beam sweeping, and measuring the quality of the one or more neighboring cells using the detected reception beam.

In each aspect of the present disclosure, the measuring the quality of the one or more neighboring cells may include measuring at least one of reference signal received power (RSRP) or reference signal received quality (RSRQ) for each of the one or more neighboring cells.

In each aspect of the present disclosure, the method may further include transmitting channel quality indicator (CQI) information for scheduling during the measurement interval to the BS.

In each aspect of the present disclosure, the transmitting the CQI information may include receiving a configuration of two CQI processes from the BS, measuring channel quality for each of the two CQI processes, and transmitting the measurement result as the CQI information, the two CQI processes may include a first CQI process and a second CQI process, the first CQI process may be configured to measure channel quality when all the plural antenna modules are used to communicate with the serving cell, and the second CQI process may be configured to measure channel quality when partial antenna modules among the plural antenna modules are used to communicate with the serving cell.

In each aspect of the present disclosure, the method may further include measuring quality of the serving cell, and receiving a configuration of the measurement interval from the BS, based on the quality of the serving cell lower than a preset threshold.

In each aspect of the present disclosure, the method may further include measuring quality of the serving cell and the quality of the one or more neighboring cells, using a reception beam formed to be suitable for the serving cell, and receiving a configuration of the measurement interval from the BS of the serving cell, based on the quality of the one or more neighboring cells higher than a preset threshold or on the quality of the one or more neighboring cells higher than the quality of the serving cell.

According to an aspect of the present disclosure, provided herein is a user equipment (UE) including a plurality of radio frequency (RF) modules and a plurality of antenna modules in a wireless communication system, including a transceiver and a processor, wherein the processor performs communication with a serving cell using a first antenna module among the plural antenna modules and controls the transceiver to measure quality of one or more neighboring cells using a second antenna module among the plural antenna modules, during a measurement interval for measuring the quality of the neighboring cells, and controls the transceiver to report a measurement result to a base station (BS) of the serving cell.

Advantageous Effects

According to the present disclosure, the received quality of neighboring cells in a wireless communication system may be more efficiently measured.

According to the present disclosure, overhead caused by the received quality of the neighboring cell may be reduced.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE DISCLOSURE

Figure 1:
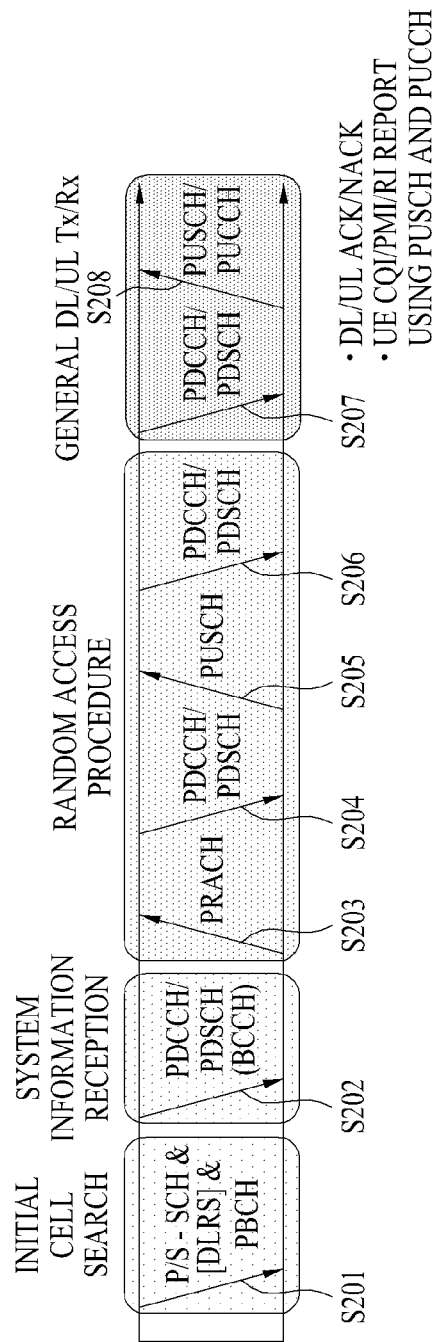
FIG. 1 is a view illustrating physical channels and a general signal transmission method using the physical channels in a 3GPP system.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The detailed description, which will be given below with reference to the accompanying drawings, is intended to explain exemplary embodiments of the present disclosure, rather than to show the only embodiments that can be implemented according to the disclosure.

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

Terms to be used in this application are defined as follows.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device.

In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). Specifically, a base station (BS) of UTRAN will hereinafter be referred to as Node-B, a base station (BS) of E-UTRAN will hereinafter be referred to as eNB, and a base station (BS) of a new radio access technology network will hereinafter be referred to as gNB.

Techniques, devices, and systems described herein can be used in various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Multi-Carrier Frequency Division Multiple Access (MC-FDMA), etc.

CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA), etc.

UTRA is a part of Universal Mobile Telecommunication System (UMTS) and $3^{rd}$ Generation Partnership Project (3GPP) Long Term Evolution (LTE) is a part of Evolved UMTS (E-UMTS) using E-UTRA. 3GPP LTE employs OFDMA for downlink and SC-FDMA for uplink. LTE-A is an evolution of 3GPP LTE. For the sake of clarity, it is assumed that the present disclosure is applied to 3GPP communication systems, for example, LTE/LTE-A systems, NR (New Radio Access Technology) system, etc. However, the technical features of the present disclosure are not limited thereto. For example, while the following detailed description is given under the assumption that a 3GPP communication system is being used as a mobile communication system, the description is applicable to any other mobile communication system except for specific features inherent to the 3GPP LTE/LTE-A/NR systems.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals.

An RS is a signal with a predefined special waveform known to both a gNode B (gNB) and a UE, and may also be referred to as a pilot. For example, cell specific RS, UE-specific RS (UE-RS), positioning RS (PRS), and channel state information RS (CSI-RS) are defined as DL RSs.

The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal.

In the present disclosure, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

For the terms and techniques which are used herein but not specifically described, 3GPP LTE/LTE-A standard documents, for example, 3GPP TS 36.211, 3GPP TS 36.212, 3GPP TS 36.213, 3GPP TS 36.321 and 3GPP TS 36.331 may be referenced, and 3GPP NR standard documents, for example, 3GPP TS 38.211, 3GPP TS 38.212, 3GPP 38.213, 3GPP 38.214, 3GPP 38.215, 3GPP TS 38.321 and 3GPP TS 38.331 may also be referenced.

FIG. 1 illustrates physical channels and a general method for transmitting signals on the physical channels in the 3GPP system.

Referring to FIG. 1, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed. As described above, the introduction of the next generation RAT considering the enhanced mobile broadband communication, massive MTC, Ultra-reliable and low latency communication (URLLC), and the like has been discussed.

In the current 3GPP, many developers and companies are conducting intensive research into the next generation mobile communication system after EPC. The next generation mobile communication system after EPC may be referred to as a new RAT (NR) system, a 5G RAT system, or a 5G system. For convenience of description, the next generation mobile communication system after EPC will hereinafter be referred to as an NR system.

Higher and superior performances better than those of the legacy 4G system in terms of a data rate, capacity, latency, energy consumption, and energy costs should be supplied to the NR system. Therefore, it is necessary for the NR system to be significantly evolved in various fields, i.e., a bandwidth, spectral, energy, signaling efficiency, and cost-per-bit reduction.

The NR system may use the OFDM transmission scheme or other similar transmission methods. For example, the NR system may use numerologies shown in the following Table 1.

TABLE 1

| Parameter | Value |
|---|---|
| Subcarrier-spacing (Δf) | 60 kHz |
| OFDM symbol length | 16.33 us |
| Cyclic Prefix (CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

As another example, the NR system may selectively use one among a plurality of OFDM numerologies shown below in Table 2.

Referring to Table 2, OFDM numerologies having subcarrier spacings of 30, 60, and 120 kHz, which are multiples of 15 kHz, may be used based on a subcarrier spacing of 15 kHz used in the LTE system. The cyclic prefix (CP) length, system bandwidth (BW), number of available subcarriers, subframe length, and number of OFDM symbols per subframe, shown in Table 2, are merely examples and the present disclosure is not limited to the examples represented in Table 2. For example, for the 60 kHz subcarrier spacing, the system BW may be set to 100 MHz and the number of available subcarriers may have a value greater than 1500 and less than 1666.

The NR system may be based on OFDM parameters of the LTE system and other parameters. Alternatively, the NR system may be based on numerologies of the legacy LTE/LTE-A without change, and may have a larger system bandwidth (e.g., 100 MHz) as compared to the legacy LTE/LTE-A. In addition, the NR system may allow one cell to support a plurality of numerologies. That is, in the NR system, UEs operating in different numerologies may coexist in one cell.

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

Figure 2:
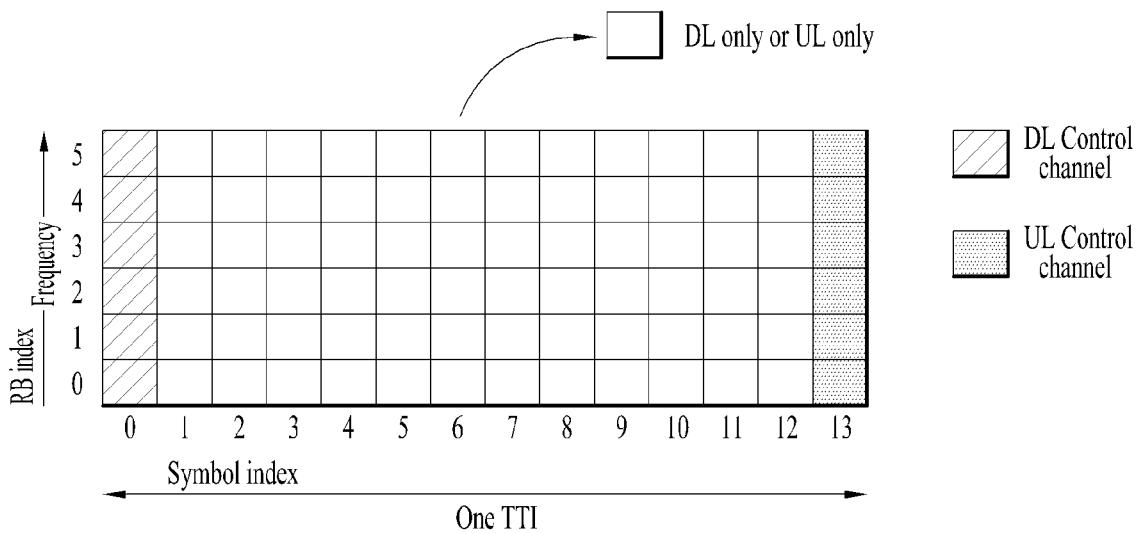
FIG. 2 is a view illustrating an exemplary slot structure available in new radio access technology (NR).

FIG. 2 illustrates an exemplary slot structure available in the new radio access technology (NR).

In the NR system, a slot structure illustrated in FIG. 2 may be used to minimize data transmission latency. The slot structure illustrated in FIG. 2 may also be referred to as a self-contained subframe structure.

Referring to FIG. 2, a hatched area represents a DL control region and a black area represents a UL control region. For example, the hatched area may represent a PDCCH transmission region for carrying DCI. The DCI is control information that a gNB transmits to a UE. The DCI may include, but is not limited to, information about cell

TABLE 2

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 us/ 4.69 us | 2.60 us/ 2.34 us | 1.30 us/ 1.17 us | 6.51 us/ 5.86 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols | configuration that the UE should know, DL specific information such as DL scheduling, and UL specific information such as UL grant. The black area may represent a PUCCH transmission region for carrying UCI. The UCI is control information that the UE transmits to the gNB. The UCI may include, but is not limited to, HARQ ACK/NACK information on DL data, CSI information about a DL channel status, and a scheduling request (SR).

In FIG. 2, an area having no mark (e.g., a symbol region from symbol index 1 to symbol index 12) may be used for transmission of a physical channel (e.g., a PDSCH) carrying DL data or may be used for transmission of a physical channel (e.g., PUSCH) carrying UL data. Referring to FIG. 2, DL transmission and UL transmission take place sequentially in one slot, and transmission/reception of DL data and reception/transmission of a UL ACK/NACK for the DL data may be performed in the one slot. Therefore, when an error is generated during data transmission, a time taken for a data retransmission may be reduced, thereby minimizing the delay of a final data transmission.

In slot structure illustrated in FIG. 2, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the NR system, a basic transmission unit is a slot. A slot duration includes 14 symbols each having a normal cyclic prefix (CP), or 12 symbols each having an extended CP. In addition, a slot is scaled in time by a function of a used subcarrier spacing.

For an NR system under discussion, a technique of using an ultra-high frequency band (for example, a frequency band at or above 6 GHz) is considered in order to transmit data to a plurality of users at a high transmission rate in a wide frequency band. However, the ultra-high frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time are limited to or below B although the number of beam directions is different according to connections between B TXRUs and Q antenna elements.

Figure 3:
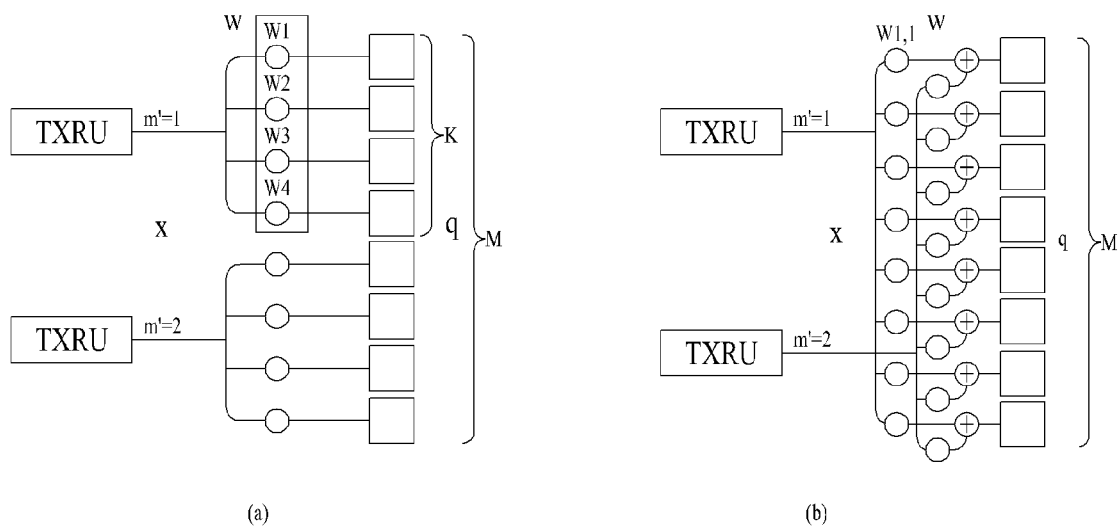
FIG. 3 is a view illustrating exemplary connection schemes between transceiver units (TXRUs) and antenna elements.

FIG. 3 is a view illustrating exemplary connection schemes between TXRUs and antenna elements.

Figure 4:
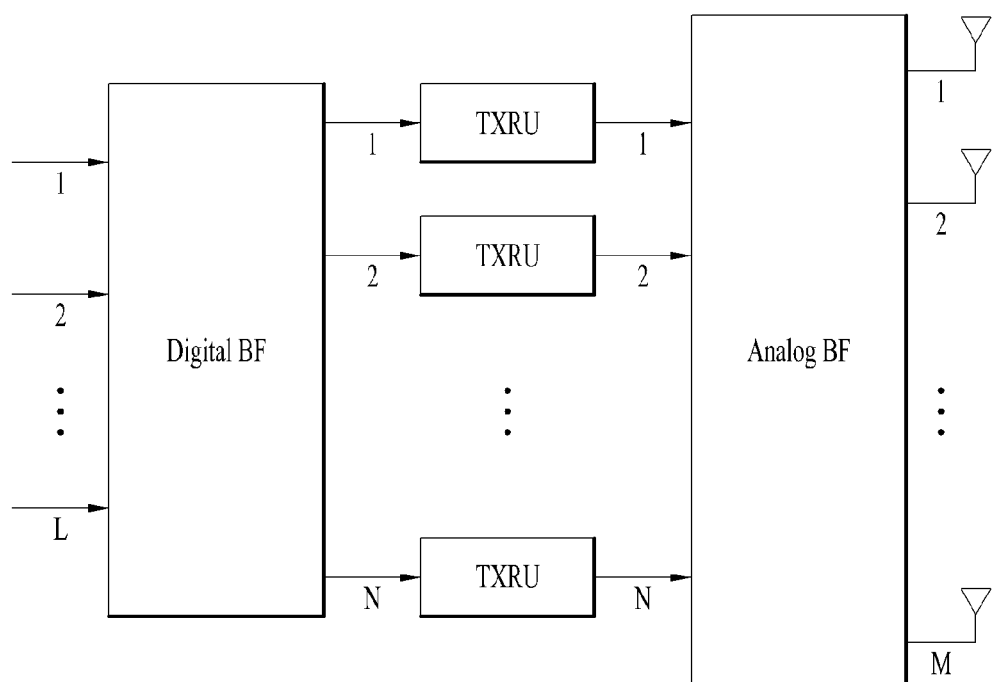
FIG. 4 is a view abstractly illustrating a hybrid beamforming structure in terms of TXRUs and physical antennas.

(a) of FIG. 3 illustrates connection between a TXRU and a sub-array. In this case, an antenna element is connected only to one TXRU. In contrast, (b) of FIG. 4 illustrates connection between a TXRU and all antenna elements. In this case, an antenna element is connected to all TXRUs. In FIG. 3, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

FIG. 4 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 4, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered.

In the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 5:
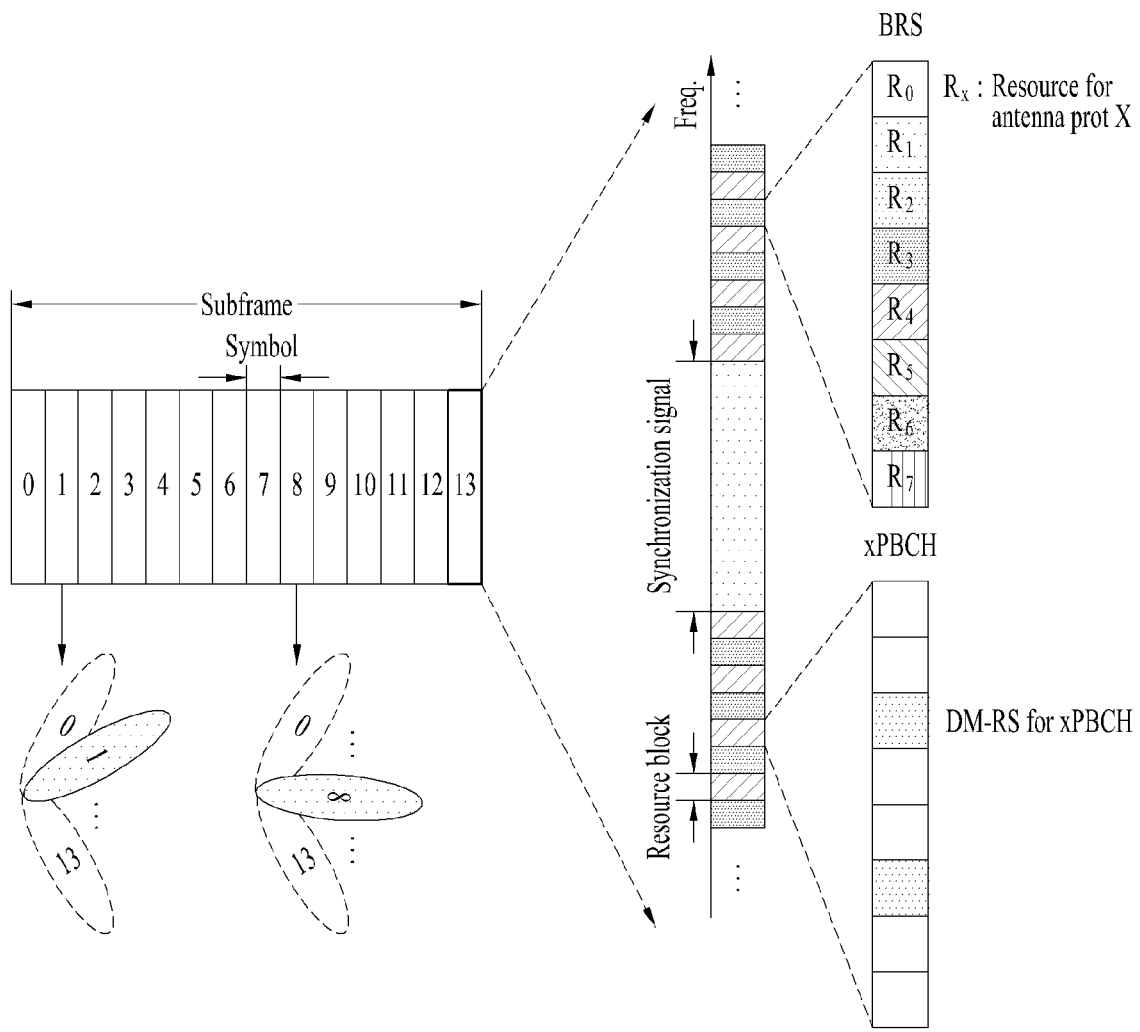
FIG. 5 illustrates a beam sweeping operation performed in a downlink signal transmission process in an NR system.

FIG. 5 illustrates a beam sweeping operation performed in a DL signal transmission process in an NR system.

Referring to FIG. 5, a process of transmitting an SS and system information is illustrated as an example of DL signal transmission. In FIG. 5, an xPBCH may mean a physical resource (or physical channel) over which system information of the NR system is broadcasted.

Analog beams belonging to different antenna panels may be simultaneously transmitted in one symbol. In this case, in order to measure a channel per analog beam, as illustrated in FIG. 5, the introduction of a beam reference signal (BRS), which is a reference signal (RS) to which a single analog beam corresponding to a specific antenna panel is applied, has been discussed. The BRS may be defined for a plurality of antenna ports and each antenna port of the BRS may correspond to a single analog beam. In this case, unlike the BRS, all analog beams in an analog beam group may be applied to the SS or xPBCH to assist a random UE in correctly receiving the SS or xPBCH.

Figure 6:
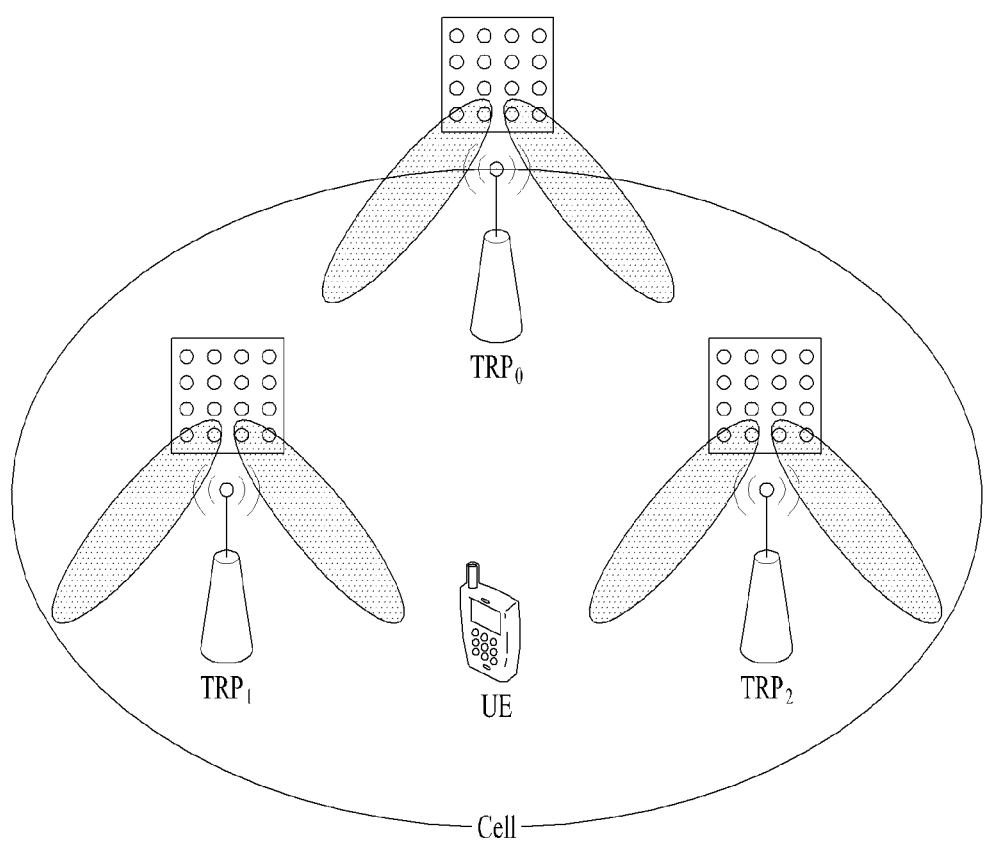
FIG. 6 is a view illustrating an exemplary cell in an NR system.

FIG. 6 is a view illustrating an exemplary cell in the NR system.

Referring to FIG. 6, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system.

Radio Resource Management (RRM) Operation of LTE System

The LTE system supports an RRM operation including power control, scheduling, cell search, cell reselection, handover, radio link or connection monitoring, and connection establishment/re-establishment. In this case, a serving cell may request that the UE send RRM measurement information corresponding to a measurement value for performing the RRM operation. For example, in the LTE system, typically, the UE may measure cell search information, reference signal received power (RSRP), reference signal received quality (RSRQ), etc., for each cell and then report the measured information to the eNB. In the LTE system, the UE receives 'measConfig' as a higher layer signal for RRM measurement from the serving cell and measures RSRP or RSRQ based on the received information of 'measConfig'. In this case, RSRP and RSRQ have been defined in the specification of TS 36.214 of the LTE system.

In the case of intra-frequency measurement, the UE operating in the LTE system may measure RSRP in bandwidth corresponding to one of 6, 15, 25, 50, 75, and 100 RBs transmitted through allowed measurement bandwidth information (e.g., AllowedMeasBandwidth information element (IE)). The allowed measurement bandwidth information may be transmitted in system information block type 3 (SIB3).

In the case of inter-frequency measurement, the UE may measure RSRP in bandwidth corresponding to one of 6, 15, 25, 50, 75, and 100 RBs transmitted through the allowed measurement bandwidth information (e.g., AllowedMeasBandwidth IE). The allowed measurement bandwidth information may be transmitted in system information block type 5 (SIB5). When the allowed measurement bandwidth information is not present, the UE may measure RSRP in the entire DL system frequency band.

Upon receiving the allowed measurement bandwidth information, the UE may regard the value of the allowed measurement bandwidth information as a maximum measurement bandwidth and freely measure RSRP within the maximum measurement bandwidth. However, if the serving cell transmits an IE defined as a wide band RSRQ (WB-RSRQ) and sets the allowed measurement bandwidth to 50 RBs or more, the UE needs to calculate RSRP for the entire allowed measurement bandwidth. Meanwhile, a received signal strength indicator (RSSI) is measured in a frequency bandwidth of a receiver of the UE according to definition of an RSSI bandwidth.

For inter-frequency or inter-RAT measurement, in the LTE system, a measurement gap for performing measurement by the UE may be defined. During the measurement gap, the UE may stop communication with the serving cell and perform inter-frequency or inter-RAT measurement.

Referring to the specification of 36.133, when the UE requires the measurement gap in order to identify and measure inter-frequency and/or inter-RAT cells, E-UTRAN should provide one measurement gap pattern having a predetermined gap duration in order to simultaneously monitor all frequency layers and RATs. Table 3 below shows gap pattern configuration supported by the UE in the LTE system.

TABLE 3

| Gap Pattern Id | Measurement-Gap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-FrequetIcy E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

Referring to Table 3, when a gap pattern Id is 0, the UE may monitor frequencies other than frequencies of the serving cell for 6 ms in units of a 40 ms period and, when the gap pattern Id is 1, the UE may monitor frequencies other than frequencies of the serving cell for 6 ms in units of an 80 ms period. For a preset time of 6 ms, the BS may not allocate a resource to the UE or transmit traffic to the UE and the UE may search for an available frequency signal for handover by measuring frequencies other than frequencies of the serving cell. During a measurement gap interval, the UE transmits no data. In addition, during the measurement gap interval, the UE does not tune a receiver of the UE in E-UTRAN subcarriers of a primary cell (PCell) and all secondary cells (SCells) and E-UTRAN subcarriers of the PCell and a primary secondary cell (PSCell). If the measurement gap of 6 ms is ended, the UE monitors the frequencies of the serving cell again.

Neighbor Cell Detection of NR System

The NR system may support a high frequency band of mmWave and transmit a data channel, a control channel, an SSB, etc. using beamforming, to secure cell coverage in the high frequency band. When a gNB transmits a signal using a plurality of beams, a UE may also use methods for expanding cell coverage by attempting to receive the data channel, the control channel, and the SSB using the plural beams.

To expand cell coverage, the UE detects a beam having the best received quality from among the plural beams transmitted by the eNB from an initial access procedure. In this case, the size of received power may be used as a quality index in a process of beam selection and operation. In the process of selecting the beam having the best received quality, the UE using the multiple beams searches for a reception beam having the best received quality with respect to each of the transmission beams, forms a pair of each transmission beam and the reception beam having the best received quality, and uses the pair of the beams to communicate with the gNB.

To this end, the gNB informs, through the control channel, the UE of through which transmission beam the data channel used to transmit data to the UE is transmitted. Accordingly, the UE first configures a reception beam suitable for a beam through which the control channel is transmitted. Then, upon receiving, through the control channel, information about the transmission beam through which the data channel is transmitted, the UE forms a reception beam having the best quality with respect to the transmission beam through which the data channel is transmitted, at a timing at which the data channel is received. Then, the UE receives the data channel using the formed reception beam.

For stable mobility securement in addition to communication with a serving cell, the UE measures the received quality of a neighboring cell and compares the received quality of the neighboring cell with the received quality of the serving cell. If a compared result satisfies a predefined event, the UE should report the result to the eNB. In this case, the received quality for mobility may use RSRP indicating received power and, when necessary, may additionally use RSRQ.

To compare the received quality of the serving cell with that of the neighboring cell, the UE measures received quality, under the assumption that a signal is received through a reception beam having the best quality with respect to each cell, and performs intercell handover based on the measured received quality.

In the LTE system, since it is assumed that the UE uses a single reception beam, a reception beam selection process for transmission beams is not needed in intra-frequency measurement. That is, since the UE receives signals using the same reception beam with respect to all cells, the UE may receive signals from the neighboring cell or perform measurement for various signals, even while the UE receives signals from the serving cell. Therefore, in the LTE system, during an interval in which the UE measures the received quality of the neighboring cell, the serving cell need not to stop transmission of the data channel or the control channel. In the LTE system, the UE may periodically perform intra-frequency measurement.

However, upon receiving the data channel or the control channel from the serving cell, the UE using multiple beams as in the NR system forms a reception beam suitable for a transmission beam of the serving cell. Accordingly, when the UE measures the received quality of the neighboring cell using the reception beam formed to be suitable for the transmission beam of the serving cell, it is difficult to equally compare the received quality of the serving cell and the received quality of the neighboring cell. Accordingly, in the NR system, the UE detects a reception beam corresponding to each of one or more neighboring cells in order to measure the received quality of the neighboring cells. In this case, since the UE is not aware of beams suitable for the neighboring cells, the UE may perform beam sweeping to detect a reception beam suitable for each of the one or more neighboring cells. However, in order to measure the received quality of the neighboring cells, when the UE forms reception beams suitable for the neighboring cells and measures the received quality of the neighboring cells using the reception beams formed to be suitable for the neighboring cells, the received quality of the data channel and the control channel received from the serving cell is remarkably degraded.

Therefore, when multiple beams are used as in the NR system, the gNB may need to configure, even for intra-frequency measurement, a measurement gap for stopping transmission of the data channel and the control channel during an interval in which the UE measures the received quality of the neighboring cells. However, when the measurement gap is formed for intra-frequency measurement and intra-frequency measurement is periodically performed as in the LTE system, service interruption always occurs due to a measurement gap interval even in a state in which the quality of the serving cell is very good, such that throughput of the UE may be significantly lowered. Since the UE should search for the best reception beam for each neighboring cell and measure the received quality of the neighboring cell using a reception beam selected for each neighboring cell, it may take a considerable time to acquire RSRP for all detected neighboring cells. Accordingly, the present disclosure proposes the following methods to measure the received quality of the neighboring cells. According to the present disclosure, if the received quality of the serving cell is higher than a threshold level, the received quality of the neighboring cells is not measured and, if the received quality of the serving cell is lower than the threshold level, the received quality of the neighboring cells may be measured. In this case, the gNB may set the measurement gap interval, which is an interval in which the UE detects reception beams suitable for one or more neighboring cells by performing a beam sweeping operation, to be relatively long According to the present disclosure, the received quality of the neighboring cells may be more efficiently measured and overhead caused by measurement of the received quality of the neighboring cells may be relatively reduced. Hereinafter, the case in which the UE is configured with one RF module and one antenna module and the case in which the UE is configured with multiple RF modules and multiple antenna modules will be separately described in detail.

Case in which the UE is Configured with One RF Module and One Antenna Module

Figure 7:
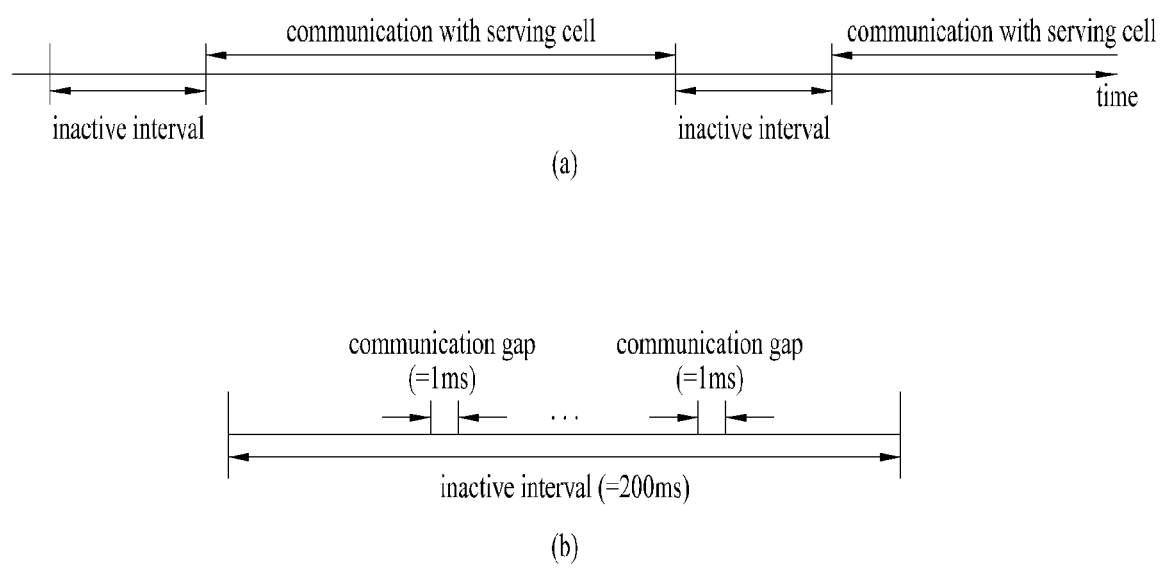
FIG. 7 is a diagram illustrating an inactive interval and a communication gap according to the present disclosure.

In the present disclosure, a low-speed mobility environment in which the UE does not move at a high speed in an environment using multiple beams is assumed. However, an operation according to the present disclosure is not limited to the low-speed mobility environment FIG. 7 is a diagram illustrating an inactive interval and a communication gap according to the present disclosure.

A gNB may configure a threshold of the signal quality of a serving cell for the UE through measurement configuration information in a call setup step. In this case, the gNB may also configure a threshold of the received quality of a neighboring cell. The measurement configuration information may represent information needed when the UE measures the received quality of the neighboring cell. For example, the measurement configuration information may include, but is not limited to, at least one of a condition for starting measurement for the received quality of the neighboring cell, a measurement period of the received quality of the neighboring cell, a threshold for the received quality of the serving cell, a threshold for the received quality of the neighboring cell, or a measurement duration.

If the UE completes call setup with the serving cell and enters a step of communicating with the serving cell, the UE basically measures only the received quality of the serving cell and does not measure the received quality of the neighboring cell even when the UE receives the measurement configuration information from the gNB. If the measured received quality of the serving cell is lower than the threshold, the UE reports a measurement result to the gNB. In this case, the received quality of the serving cell may include a signal to interference plus noise ratio (SINR) or CQI indicating the signal quality of a data channel received from the serving cell, as well as RSRP for mobility support.

According to another embodiment, the UE may attempt to detect the neighbor cell or measure the received quality of the neighboring cell while maintaining a beam which is formed to be suitable for the serving cell so as not to disconnect communication with the serving cell. If the received quality of the neighboring cell measured based on the beam formed to be suitable for the serving cell satisfies a preset condition, the UE may report a measurement result to the gNB. For example, when the received quality of the neighboring cell is higher than the preset threshold or the received quality of the neighboring cell is higher than the received quality of the serving cell by the threshold or more even if the received quality of the neighboring cell is measured based on the beam formed to be suitable for the serving cell, the UE may report the measurement result to the gNB.

The gNB may periodically or aperiodically configure, for the UE, a measurement gap for measuring the received quality of the neighboring cell. If the measurement gap is aperiodically configured, the gNB may configure the measurement gap for the UE when a preset condition is satisfied or a preset event occurs. For example, as described above, when the gNB receives a report on the received quality of a current serving cell or the received quality of the neighboring cell from the UE, the gNB may configure the measurement gap for the UE. However, configuration of the measurement gap is not limited thereto. When the gNB aperiodically configures the measurement gap, the gNB may configure the measurement gap after determining the amount of data to be transmitted to the UE.

In the NR system, if the UE is configured with one RF module and one antenna module, communication with the serving cell may be disconnected in order for the UE measure the received quality of the neighboring cell. That is, since communication with the serving cell may be inactivated during a measurement gap interval for measuring the received quality of the neighboring cell, the measurement gap may be referred to as an inactive interval. Referring to FIG. 7(a), the inactive interval is distinguished from an interval in which the UE performs communication with the serving cell. During the inactive interval, communication with the serving cell may be disconnected.

The UE using multiple beams detects one or more neighboring cells and beams optimized for the respective neighboring cells by performing beam sweeping and measures the received quality of the neighboring cells using the beams optimized for the respective neighboring cell. Therefore, the inactive interval may be set to a longer interval than a conventional measurement gap. For example, when the number of detected neighboring cells is 10 and the number of reception beams is 8, 80 beam sweeping operations may be needed to detect beams optimized for the 10 neighboring cells. For example, when the UE measures the received quality of the neighboring cells based on an SSB, if the SSB is received in units of 5 ms and 8 reception beams are present, a time of 40 ms or more may be needed to sweep all of the reception beams. Thus, the inactive interval may be interpreted as a long measurement gap.

The UE may perform an operation of detecting the neighboring cells during the configured inactive interval and detecting an optimal transmission beam and reception beam for each cell. The UE measures RSRP and RSRQ per cell and per beam using the optimal reception beam for a selected transmission beam. After the inactive interval is ended, the UE immediately reports a measurement result to the gNB. However, if the UE fails to detect the neighboring cells or if the received quality of the serving cell is higher than the preset threshold, the UE may report the measurement result to the gNB or request that the gNB end the inactive interval.

If the UE may adaptively form a wide beam width of a receiver, the UE may omni-directionally form beams during the inactive interval so as to cover all of the serving cell and the neighboring cells. The UE may communicate with the serving cell and simultaneously measure the received quality of the neighboring cells using the omni-directionally formed beams. However, when the UE communicates with the serving cell using the beams formed to cover all of the serving cell and the neighboring cells, the signal quality received from the serving cell may be relatively low. Therefore, when the UE communicates with the serving cell and simultaneously measures the received quality of the neighboring cells by omni-directionally forming the beams, this operation may be performed by the UE itself but may be performed through configurations of the gNB.

For the operation of the UE performed during the inactive interval, the gNB may transmit the following configurations to the UE:

A. a starting time and duration of the inactive interval;
B. resource allocation information of an RS for RSRP or RSRQ measurement for the neighboring cell;
C. information about configuration of a communication gap for performing communication with the serving cell during the inactive interval; and
D. resource information for transmitting a PUSCH during the communication gap interval or after the end of the inactive interval.

In this case, the resource allocation information of the RS for RSRP or RSRQ measurement for the neighboring cell may include, but is not limited to, resource configuration information including a transmission period of an SSB of the neighboring cell, information about the location of an SSB transmitted in an SS burst set, and resource configuration information of CSI-RS during reporting of RSRP using the CSI-RS.

As the inactive interval is configured to be relatively long, when communication with the serving cell is disconnected for a long time, an environment may be changed such that communication with the serving cell is not possible after the inactive interval is ended. For example, in order to maintain communication with the serving cell, an operation of periodically performing a report (e.g., a report on CQI information or UL time tracking information) to the serving cell is required. However, if the inactive interval is started and the beam sweeping operation is performed, communication with the serving cell is disconnected and, if the inactive interval is set to be long, it may be difficult for the UE to periodically perform a report to the serving cell. Therefore, when the inactive interval is set to be long, the gNB may set a communication gap interval within the inactive interval so that the UE may perform minimum communication with the serving cell. For example, during the inactive interval, the gNB may allocate, to the UE, a resource for minimum channel quality and parameter measurement and a resource for reporting the measurement result of channel quality and parameters. For example, referring to FIG. 7(b), when the inactive interval is set to a length of 200 ms, the gNB may configure one or more communication gaps each having a length of 1 ms within the inactive interval.

During the inactive interval, the UE may perform necessary measurement, transmit a configured signal, or report a measurement result to the eNB. For example, operations performed by the UE during the communication gap interval may include at least one of time and frequency tracking, beam management, CSI report, UL control channel transmission, UL time alignment, or minimum DL and UL data transmission and reception. If measurement for the received quality of the neighboring cell is ended or it is determined that an urgent report is demanded from the received quality measurement, the UE may perform a report on a measurement result during the communication gap interval. As described above, the UE immediately reports the measurement result to the gNB after the inactive interval is ended. However, even before the inactive interval is ended, if it is determined that the received quality of the neighboring cell is better than the received quality of the serving cell, the UE may report the measurement result to the gNB during the communication gap interval without waiting until the inactive interval is ended. For example, when the inactive interval is set to a length of 320 ms, the communication gap is configured in units of 8 ms, and all of the received quality values of multiple neighboring cells are better than the received quality of the serving cell, the UE may report the measurement result to the gNB even before the inactive interval of 320 ms is ended. In this case, the UE may report the measurement result to the gNB and wait to receive a handover command from the gNB.

The UE may transmit messages to the gNB in order to report CSI, report the measurement result of the received quality of the neighboring cells, or request the gNB to stop the inactive interval, during the communication gap interval as described above. Therefore, it is efficient to preconfigure a resource of the PUSCH transmitted during the communication gap interval for the UE. Then, the gNB may transmit resource information for transmitting a PUSCH to the UE during the communication gap interval or after the inactive interval is ended.

The above-described operations may be equally applied to inter-frequency measurement in a system suitable for low-speed mobility.

Case in which UE is Configured with Multiple RF Modules and Multiple Antenna Modules In the same environment, when the UE is configured with multiple RF modules and antenna modules and performs communication by forming beams in different directions in one frequency band, the UE may perform an operation different from that when the UE is configured with one RF module and antenna module.

For example, when the UE is configured with multiple RF modules and antenna modules, it is not necessary to use all the RF modules and antenna modules for measurement of the received quality of neighboring cells. Then, some antenna modules among the multiple antenna modules may be used to form a beam in a direction for communication with the serving cell and communicate with the serving cell using a beam optimized for the serving cell. The remaining antenna modules except for the antenna modules used to communicate with the serving cell may be used to perform operations of forming beams in various directions, detecting neighboring cells using the beams formed in various directions, searching for beams optimized for the neighboring cells, and measuring the received quality of the neighboring cells.

When the UE is configured with multiple RF and antenna modules, a measurement gap for measuring the received quality of the neighboring cells may be configured. In this case, the measurement gap may be configured through a process similar to the configuration process of the above-described inactive interval and the gNB may configure the measurement gap at a timing at which call setup is ended or at an arbitrary timing.

According to an embodiment, the gNB configures the measurement gap for the UE at a specific timing based on reporting of the UE, similarly to the case in which the UE is configured with one RF module and one antenna module. The gNB may configure at least one of antenna modules which will be used to measure the received quality of the neighboring cells or the number of antenna modules which will be used to measure the received quality of the neighboring cells among the all antenna modules, in the process of configuring the measurement gap.

According to an embodiment, the UE may pre-report, to the gNB, the number of antenna modules which may be used to measure the received quality of the neighboring cells among all the antenna modules. The gNB may perform scheduling by considering the number of antenna modules capable of being used to receive data from the serving cell during the measurement gap interval. The UE may detect the neighboring cells during the measurement gap and measure the received quality of the neighboring cells.

The gNB of the serving cell may configure two CQI processes (e.g., a first CQI process and a second CQI process) for the UE in order to obtain CQI information for scheduling during the measurement gap interval. For example, for the first CQI process, the UE may measure channel quality when all the antenna modules are used to receive data from the serving cell and, for the second CQI process, the UE may measure channel quality when some antenna modules of all the antenna modules are used to receive data from the serving cell, so that the UE may report the measurement result to the gNB. Although CQI reports on the first CQI process and the second CQI process may be periodically performed, the CQI reports may be performed at different periods. For example, the report on the first CQI process may be performed at, but is not limited to, a shorter period than the report on the second CQI process.

The gNB is previously aware of CQI reporting timings for the first CQI process and the second CQI process and may determine channel quality states for the case in which the UE receives data from the serving cell and the case in which the UE measures the received quality of the neighboring cells while receiving data from the serving cell, based on CQI values for the two CQI processes.

According to another embodiment, the gNB may not be aware of which antenna modules among the multiple antenna modules are used to measure the received quality of the neighboring cells or how many antenna modules are used to measure the received quality of the neighboring cells. For example, the gNB and the UE may not previously share configuration information about the quality measurement of the neighboring cells and the UE may determine that measurement for the received quality of the neighboring cell sis needed. Then, the UE may measure the received quality of the neighboring cells without previously performing reporting to the eNB. For example, the UE may continue to perform CQI reporting on the first CQI process and, if it is determined that measurement for the received quality of the neighboring cell sis needed, the UE may perform CQI reporting on the second CQI process. In this case, the gNB may not be aware of an interval in which the UE measures the received quality of the neighboring cells and performs scheduling based on the CQI value for the second CQI process.

However, even when the UE performs an operation of measuring the received quality of the neighboring cells without an additional report or indication, a condition for performing the measurement operation may be determined based on a configuration of the gNB. If an interval during which the measurement operation is performed is a measurement duration, the UE reports CQI to the gNB from a timing before N slots of a starting time of the measurement duration to an ending timing of the measurement duration so that there may be no scheduling problem during the measurement duration. In this case, the UE measures the CQI under the assumption that there is no antenna module to be used to measure the received quality of the neighboring cells, so that the gNB has no problem in receiving scheduled data. When an SRS is used to employ channel reciprocity or the SRS is used to perform UL data scheduling, transmission of the SRS through an antenna module to be used to measure the received quality of the neighboring cells may be stopped during the measurement duration, so that there is no problem in measuring the transmission quality of UL data.

The above-proposed methods when the UE is configured with multiple RF modules and antenna modules may be equally applied even to inter-frequency measurement as well as to intra-frequency measurement.

Figure 8:
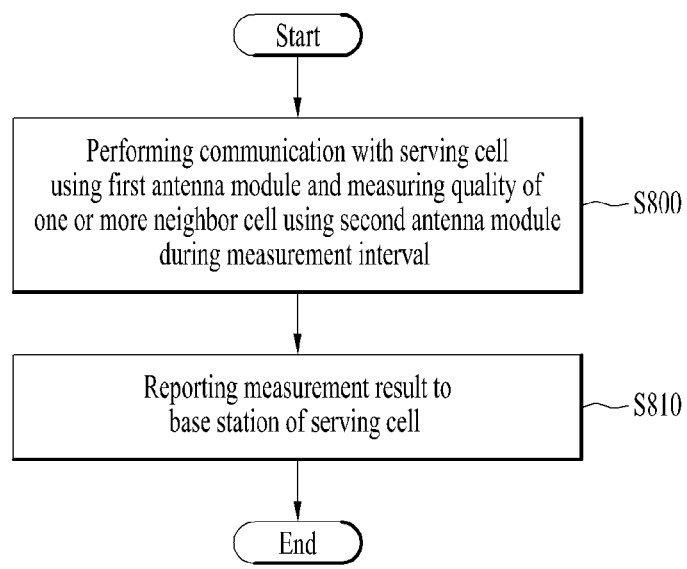
FIG. 8 is a flowchart illustrating a method of transmitting a signal by a UE according to the present disclosure.

FIG. 8 is a flowchart illustrating a method of transmitting a signal by a UE to a BS according to the present disclosure.

Referring to FIG. 8, in step S800, the UE performs communication with a serving cell using a first antenna module among a plurality of antenna modules and measures the received quality of one or more neighboring cells using a second antenna module among the plural antenna modules, during a measurement interval for measuring the quality of the neighboring cells. In this case, the measurement interval may be referred to as, but is not limited to, the measurement gap or the inactive interval as described above.

The plural antenna modules may include the first antenna module and the second antenna module. Each of the first antenna module and the second antenna module may include one or more antenna modules. If the UE is configured with the plural antenna modules, all of the antenna modules need not to be used to measure the quality of the neighboring cells. Therefore, the UE may measure the quality of the neighboring cells using the second antenna module, which is a part of the plural antenna modules, so that the UE may continue to maintain communication with the serving cell even while the quality of the neighboring cells is measured.

The measurement interval for measuring the quality of the neighboring cells may be periodically or aperiodically configured by the gNB. When the measurement interval is aperiodically configured, the gNB may configure the measurement interval for the UE when the quality of the serving cell is lower than a preset threshold. Even when the quality of the neighboring cells measured using a reception beam formed to be suitable for the serving cell is higher than the preset threshold or the quality of the neighboring cells is higher than the quality of the serving cell, the BS may configure the measurement interval for the UE.

Upon measuring the quality of the neighboring cells, the UE may detect the one or more neighboring cells by performing beam sweeping and detect a reception beam corresponding to a transmission beam of each of the detected neighboring cells. Then, the UE may measure the quality of the one or more neighboring cells using the detected reception beam. In this case, the UE may measure at least one of RSRP or RSRQ for each of the neighboring cells as an index indicating the quality of the neighboring cells.

To measure the quality of the neighboring cells, the UE may previously receive configuration information about the quality measurement of the neighboring cells from the gNB of the serving cell. In this case, the configuration information may include at least one of a starting time of the measurement interval, the length of the measurement interval, or resource allocation information of an RS for measuring the quality of the neighboring cells. According to an embodiment, the configuration information may include, but is not limited to, the types of antenna modules and the number of antenna modules included in the second antenna module among the plural antenna modules constituting the UE.

In S810, the UE reports the measurement result to the gNB of the serving cell.

In addition, when the UE is configured with the plural antenna modules, communication with the serving cell is not disconnected even while the UE measures the quality of the neighboring cells. Therefore, the BS may transmit a data channel and a control channel to the UE even during the measurement interval and the UE may transmit CQI information for scheduling during the measurement interval to the gNB of the serving cell. In this case, the UE may transmit the CQI information for scheduling during the measurement interval to the gNB of the serving cell. To acquire CQI information about an interval in which the quality of the neighboring cells is not measured and about an interval in which the quality of the neighboring cells is measured, the BS may configure two CQI processes for the UE. For example, the two CQI processes may include a first CQI process and a second CQI process. The first CQI process is configured to measure channel quality when all the plural antenna modules constituting the UE are used to communicate with the serving cell and the second CQI process may be configured to measure channel quality when partial antenna modules (e.g., the first antenna module) among the plural antenna modules are used to communicate with the serving cell. The UE may measure CQI for each of the two CQI processes and report the measured CQI value to the gNB.

Figure 9:
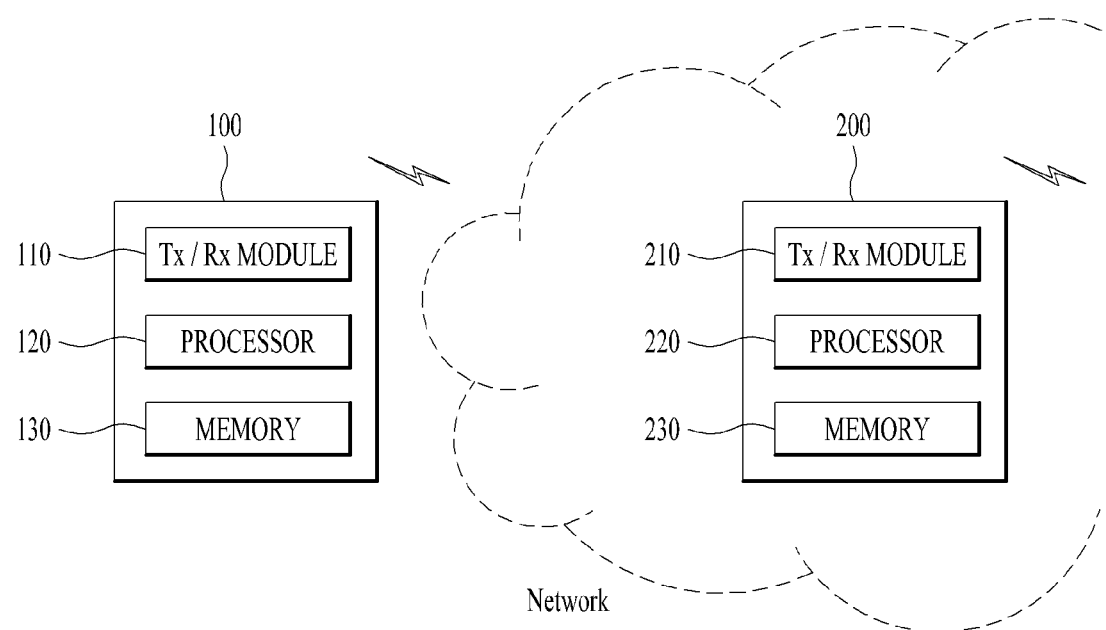
FIG. 9 is a diagram illustrating a configuration of a user equipment (UE) and a base station (BS).

FIG. 9 is a diagram illustrating a configuration of a user equipment (UE) and a base station (BS).

The UE 100 according to the present disclosure may include a transceiver 110, a processor 120, and a memory 130. The transceiver 110 of the UE 100 may be referred to as a radio frequency (RF) unit or a Tx/Rx module. The transceiver 110 may be configured to transmit and receive various signals, data and information to and from an external device. Alternatively, the transceiver 110 may be divided into a transmitter and a receiver. The UE 100 may be connected to the external device by wire and/or wirelessly. The processor 120 may control overall operation of the UE 100, and be configured to calculate and process information for the UE 100 to transmit and receive to and from the external device. In addition, the processor 120 may be configured to perform the proposed operations of the UE 100. The processor 120 may also be configured to control the transceiver 110 to transmit data or messages according to the proposal of the present disclosure. The memory 130 may store the calculated and processed information for a predetermined time, and may be replaced by another constituent such as a buffer (not shown).

Referring to FIG. 9, the BS 200 according to the present disclosure may include a transceiver 210, a processor 220, and a memory 230. If the BS 200 communicates with the UE 100, the transceiver 210 may be referred to as a Tx/Rx module or a radio frequency (RF) unit. The transceiver 210 may be configured to transmit and receive various signals, data and information to and from an external device. The BS 200 may be connected to the external device by wire and/or wirelessly. The transceiver 210 may also be divided into a transmitter and a receiver. The processor 220 may control overall operation of the BS 200, and be configured to calculate and process information for the BS 200 to transmit and receive to and from the external device. In addition, the processor 220 may be configured to perform the proposed operations of the BS 200. The processor 220 may also be configured to control the transceiver 210 to transmit data or messages according to the proposal of the present disclosure. The memory 230 may store the calculated and processed information for a predetermined time, and may be replaced by another constituent such as a buffer (not shown). The BS 200 may be eNB or gNB.

For configuration of the UE 100 and the BS 200, the details described in various embodiments of the present disclosure may be independently applied or implemented such that two or more embodiments are simultaneously applied. For simplicity, redundant description is omitted.

The processor 120 of the UE 100 according to the present disclosure may perform communication with a serving cell using a first antenna module among a plurality of antenna modules, control the transceiver 110 to measure the received quality of one or more neighboring cells using a second antenna module among the plural antenna modules, and control the transceiver 110 to report a measurement result to the BS of the serving cell, during a measurement interval for measuring the quality of the neighboring cells.

The embodiments of the present disclosure may be implemented through various means. For example, the embodiments may be implemented by hardware, firmware, software, or a combination thereof.

When implemented by hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable not only to 3GPP systems, but also to various wireless communication systems including IEEE 802.16x and 802.11x systems. Moreover, the proposed method can also be applied to mmWave communication using an ultra-high frequency band.

The invention claimed is:

1. A method performed by a user equipment (UE) including a plurality of radio frequency (RF) modules and a plurality of antenna modules in a wireless communication system, the method comprising:
   performing communication with a serving cell using a first antenna module among the plural antenna modules;
   detecting one or more neighboring cells and a reception beam corresponding to a transmission beam of each of the detected one or more neighboring cells by performing beam sweeping;
   measuring quality of the one or more neighboring cells using a second antenna module among the plural antenna modules and the detected reception beam, during a measurement interval for measuring the quality of the one or more neighboring cells; and
   reporting, to a base station (BS) of the serving cell, a measurement result.

2. The method of claim 1, further comprising:
   receiving, from the BS, configuration information about measurement of the quality of the one or more neighboring cells,
   wherein the configuration information comprises at least one of a starting time of the measurement interval, a length of the measurement interval, or resource allocation information of a reference signal for measuring the quality of the one or more neighboring cells.

3. The method of claim 2,
   wherein the configuration information further comprises at least one of information about types of antenna modules included in the second antenna module or information about the number of antenna modules included in the second antenna module.

4. The method of claim 1,
   wherein the measuring the quality of the one or more neighboring cells comprises measuring at least one of reference signal received power (RSRP) or reference signal received quality (RSRQ) for each of the one or more neighboring cells.

5. The method of claim 1, further comprising:
   transmitting, to the BS, channel quality indicator (CQI) information for scheduling during the measurement interval.

6. The method of claim 5,
   wherein the transmitting the CQI information comprises:
   receiving a configuration of two CQI processes from the BS;
   measuring channel quality for each of the two CQI processes; and
   transmitting the measurement result as the CQI information,
   wherein the two CQI processes comprise a first CQI process and a second CQI process, and
   wherein the first CQI process is configured to measure channel quality when all the plural antenna modules are used to communicate with the serving cell and the second CQI process is configured to measure channel quality when partial antenna modules among the plural antenna modules are used to communicate with the serving cell.

7. The method of claim 1, further comprising:
   measuring quality of the serving cell; and
   receiving, from the BS, configuration information about the measurement interval based on the quality of the serving cell lower than a preconfigured threshold.

8. The method of claim 1, further comprising:
   measuring quality of the serving cell and the quality of the one or more neighboring cells, using a reception beam formed to be suitable for the serving cell; and
   receiving, from the BS of the serving cell, configuration information about the measurement interval, based on the quality of the one or more neighboring cells higher than a preconfigured threshold or on the quality of the one or more neighboring cells higher than the quality of the serving cell.

9. A user equipment (UE) including a plurality of radio frequency (RF) modules and a plurality of antenna modules in a wireless communication system, the UE comprising:
   a transceiver; and
   a processor,
   wherein the processor is configured to control the transceiver to:
   perform communication with a serving cell using a first antenna module among the plural antenna modules;
   detect one or more neighboring cells and a reception beam corresponding to a transmission beam of each of the detected one or more neighboring cells by performing beam sweeping;
   measure quality of the one or more neighboring cells using a second antenna module among the plural antenna modules and the detected reception beam, during a measurement interval for measuring the quality of the one or more neighboring cells; and
   report a measurement result to a base station (BS) of the serving cell.

* * * * *